United States Patent

[11] 3,581,636

[72] Inventor Helmut Ettischer
 Ruit/Kreis Esslingen, Germany
[21] Appl. No. 744,785
[22] Filed July 15, 1968
[45] Patented June 1, 1971
[73] Assignee Eastman Kodak Company
 Rochester, N.Y.

[54] PHOTOGRAPHIC CAMERA WITH BUILT-IN FLASH DEVICE FOR FLASH CUBES AND FLASH SOCKET FOR SEPARATE FLASH DEVICES
 2 Claims, 2 Drawing Figs.

[52] U.S. Cl.................................................... 95/11,
 240/1.3
[51] Int. Cl................................................ G03b 19/00
[50] Field of Search........................................ 95/11
 (Lamp); 240/1.3; 339/32, 33, 147

[56] References Cited
 UNITED STATES PATENTS
 2,976,398  3/1961  McKee et al.............. 240/1.3
 3,418,906  12/1968  Wick et al................ 240/1.3
 FOREIGN PATENTS
 849,513  9/1952  Germany.................. 240/1.3
 1,18,914  1/1965  Germany.................. 95/11 LAMP Primary Examiner—John M. Horan
Assistant Examiner—Alan Mathews
Attorneys—Robert W. Hampton and Ronald S. Kareken ABSTRACT: A camera having a flashcube socket and a separate flash device socket adjacent each other. The two sockets are closely located so that, owing to the large lateral dimensions of the flashcube relative to the size of its socket, normal use of either socket prevents normal use of the other socket.

Patented June 1, 1971  3,581,636

HELMUT ETTISCHER
INVENTOR

BY
ATTORNEYS

PHOTOGRAPHIC CAMERA WITH BUILT-IN FLASH DEVICE FOR FLASH CUBES AND FLASH SOCKET FOR SEPARATE FLASH DEVICES

BACKGROUND OF THE INVENTION

1. Field of the Invention

This invention relates to cameras, and more particularly to cameras with built-in flash devices for receiving flashcubes.

2. Description of the Prior Art

It is known to provide a photographic camera with both a built-in flash device for a flashcube and with means for receiving the socket of another type of flash device. In such a camera, it is necessary to provide means for breaking the flashcube firing circuit when it is desired to utilize the other socket for the separate flash device. Otherwise, if the flashcube firing circuit is not interrupted, the separate flash device, particularly an electronic flash unit, may fail to be fired by the battery, and possibly, a capacitor or other component of the built-in firing circuit could be damaged.

In several prior art arrangements, mechanical control means have been provided to actuate electrical switches to disconnect the built-in flashcube firing circuit. However, such additional means have the disadvantage of making a camera more expensive or frequently operating inefficiently since the switches are controlled by projections, noses, pins or the like.

SUMMARY OF THE INVENTION

The present invention provides, in a photographic camera, simple, reliable and safe means for receiving both a flashcube and the connecting plug of a separate flash or other illumination device.

According to the present invention, the socket for the separate flash device is located adjacent to and at a predetermined distance from the flashcube receiving socket such that a flashcube inserted in its socket will partially or entirely cover the socket intended for the separate flash device, thereby preventing the simultaneous fitting of the plug of the separate flash device. Moreover, the reverse also is true in that the plug of a separate flash device positioned in the separate device socket will prevent attachment of a flashcube to the flashcube receiving socket.

According to a further feature of the resent invention, the edge of the flashcube receiving socket is raised so that the camera operator is protected against touching the bulb firing means such as electrical elements of the flashcube receiving socket, which may otherwise establish an electrical potential when a separate flash unit is attached.

The invention as well as objects and advantages will become apparent from the detailed description of a preferred embodiment that follows.

BRIEF DESCRIPTION OF THE DRAWING

In the description of the preferred embodiment of the invention, reference is made to the accompanying drawing forming a part of the description and wherein.

DESCRIPTION OF THE PREFERRED EMBODIMENT

Because photographic cameras are well known, the present description will be limited to those elements forming part of or cooperating directly with the present invention, the elements of a camera not shown or described herein being understood to be selected from those known in the art.

Figure 1:
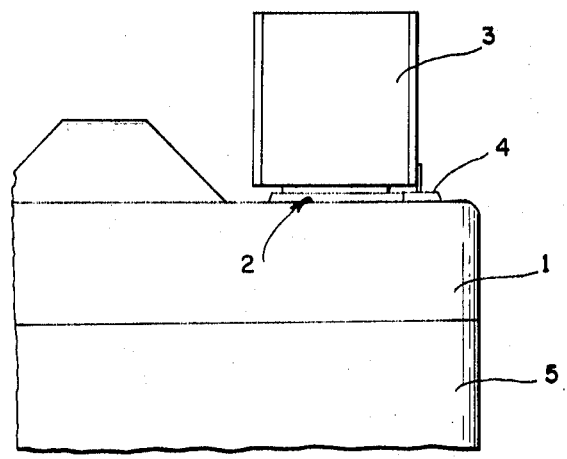
FIG. 1 is a side view of a portion of a camera according to the invention and showing a flashcube receiving socket and a second socket for receiving a separate flash device.
Figure 2:
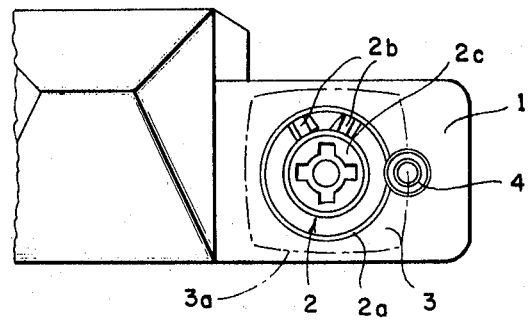
FIG. 2 is a plan view of the arrangement shown in FIG. 1 wherein the outer contours of the flashcube are shown in broken lines.

Referring now to the drawings, FIGS. 1 and 2 illustrate the pertinent portion of a photographic camera 1 having a built-in flashcube receiving socket 2 in which is inserted a flashcube 3. Flashcube receiving socket 2 is mounted in the top of a camera 1. According to the invention, flashcube receiving socket 2 is provided with a raised peripheral edge 2a, which comprises the only visible portion of the socket when viewed from the side. Raised edge 2a, as shown, reduces the danger of an operator touching the bulb firing means such as electrical contacts 2b located in the socket 2 in a manner known per se. Also the center portion 2c receives the flashcube base and is rotatable to index the flashcube 3 in a known manner.

Immediately adjacent the socket 2 there is provided a second socket 4 which is adapted to receive in a known manner the plug of a flash cable for a separate flash device such as an electronic flash unit. Also, attachment of a flashcube may adjust the camera mechanism by changing shutter speed to an appropriate value such as one-fortieth of a second, whereas attachment of a cable connector may change shutter speed to a value appropriate for electronic flash, such as one two-hundredths of a second.

FIG. 2 illustrates the relative positions of sockets 2 and 4 according to the invention. As is well known, flashcube 3 has a plurality of separate flashbulbs and is rotated for sequentially locating the flashbulbs in the operative position. Thus, as is evident from FIG. 2, flashcube 3, when attached, will partially or completely overlie socket 4. In any position of attached flashcube 3, however, the flashcube 3 covers enough of the socket 4 to preclude inserting the plug of the separate flash device into socket 4. Also, no flashcube can be inserted into the flashcube receiving socket 2 when the plug of the separate flash device is fitted into the socket 4.

While socket 4 has been shown as a separate unit, it may be provided as an integral part of the socket 2.

Thus, it is now apparent that only one flash unit may be attached, and because each unit may condition the camera in a unique manner, mechanical overrides (as for shutter speed) as well as electrical switches are not required.

The invention has been described in detail with particular reference to preferred embodiments thereof, but it will be understood that variations and modifications can be effected within the spirit and scope of the invention as described hereinabove and as defined in the appended claims.

I claim:

1. A photographic camera having a built-in flash device and a first socket located at a surface of the camera for receiving a flash unit, the first socket comprising bulb firing means and an edge forming the outer periphery of the first socket, the edge being raised from the surface of the camera to prevent an operator from touching the first socket firing means, and a second socket formed in the surface of the camera adjacent the first socket for receiving the plug of a separate illumination device, the second socket being spaced form the first socket such that at least a portion of a flash unit in the first socket overlies the second socket to prevent use of the second socket and the plug of a separate flash device received in the second socket prevents use of the first socket.

2. A photographic camera having a built-in flash device and a first socket located at a surface of the camera for receiving a flash unit, and a second socket formed in the surface of the camera adjacent the first socket for receiving the plug of a separate illumination device, the second socket comprising means to receive the plug of an electronic flash unit and being spaced from the first socket such that at least a portion of a flash unit in the first socket overlies the second socket to prevent use of the second socket and the plug of a separate flash device received in the second socket prevents use of the first socket.